(12) United States Patent
Uchiumi et al.

(10) Patent No.: US 7,683,135 B2
(45) Date of Patent: Mar. 23, 2010

(54) ETHYLENE-VINYL ALCOHOL BASED COPOLYMER AND METHOD FOR PRODUCTION THEREOF

(75) Inventors: Naohiko Uchiumi, Kurashiki (JP); Takashi Wakui, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 350 days.

(21) Appl. No.: 10/551,523

(22) PCT Filed: Mar. 31, 2004

(86) PCT No.: PCT/JP2004/004728

§ 371 (c)(1),
(2), (4) Date: Sep. 11, 2006

(87) PCT Pub. No.: WO2004/092234

PCT Pub. Date: Oct. 28, 2004

(65) Prior Publication Data

US 2007/0106031 A1    May 10, 2007

(30) Foreign Application Priority Data

Mar. 31, 2003 (JP) .............................. 2003-096815
Mar. 31, 2003 (JP) .............................. 2003-096816

(51) Int. Cl.
*C08F 18/08* (2006.01)
*C08C 19/36* (2006.01)
*C08F 8/12* (2006.01)

(52) U.S. Cl. ............... 525/330.6; 525/337; 525/369; 525/384

(58) Field of Classification Search ............. 525/330.6, 525/337, 369, 384
See application file for complete search history.

(56) References Cited

U.S. PATENT DOCUMENTS

| | | | | |
|---|---|---|---|---|
| 5,352,750 A | * | 10/1994 | Yanai et al. | 526/225 |
| 6,472,470 B1 | * | 10/2002 | Fujiwara et al. | 525/61 |
| 6,552,123 B1 | * | 4/2003 | Katayama et al. | 525/57 |

FOREIGN PATENT DOCUMENTS

| | | |
|---|---|---|
| BE | 1004476 A3 | 12/1992 |
| EP | 1 008 605 A1 | 6/2000 |
| JP | 2-258809 | 10/1990 |
| JP | 2000-309607 | 11/2000 |
| JP | 2001-19712 | 1/2001 |
| JP | 2001-164059 | 6/2001 |
| JP | 2001-200070 | 7/2001 |
| JP | 2002-148221 | 5/2002 |
| WO | 99/05213 | 2/1999 |

* cited by examiner

*Primary Examiner*—Roberto Rábago
(74) *Attorney, Agent, or Firm*—Oblon, Spivak, McClelland, Maier & Neustadt, L.L.P.

(57) ABSTRACT

The present invention provides an ethylene-vinyl alcohol based copolymer (EVOH) having fundamentally improved thermal stability. The EVOH is characterized in that the proportion of ethylene units (III) is from 20 to 60 mole % with respect to the total (III+IV+V) of ethylene units (III), vinyl alcohol units (IV), and vinyl ester units (V), and the proportion of the total (I+II) of carboxylic acids units (I) and lactone ring units (II) in copolymer terminals with respect to the total (III+IV+V) is 0.12 mole % or less. The EVOH can be obtained by, for example, contacting a reducing agent with an ethylene-vinyl ester based copolymer before saponification and/or EVOH after saponification.

9 Claims, 4 Drawing Sheets

ETHYLENE-VINYL ALCOHOL BASED COPOLYMER AND METHOD FOR PRODUCTION THEREOF

TECHNICAL FIELD

The present invention relates to an ethylene-vinyl alcohol based copolymer having good long-term run stability in melt molding, and a method for producing the same.

BACKGROUND ART

Ethylene-vinyl alcohol based copolymer (hereinafter also referred to as "EVOH") is a thermoplastic resin that is excellent in gas barrier properties, oil resistance, antistatic properties, mechanical strength, and the like. EVOH is widely used for various packaging materials such as films, sheets, and containers. To be processed into various molded products, EVOH is molded in a molten state by, for example, extrusion molding or injection molding. When molding EVOH in a molten state, the molding temperature usually needs to be 200° C. or higher. For this reason, thermal degradation tends to occur, and the molded products may suffer from fish eyes or hard spots, which can be a cause of degradation in product quality.

It has been known that the long-term run stability of EVOH is improved by adding to the EVOH an organic carboxylic acid, an alkali metal salt, an alkaline earth metal salt, a phosphate, or the like (for example, WO99/05213 and JP 2001-164059A). However, such a method, which seems to be a stopgap measure, has not resolved the problem fundamentally nor achieved an improvement in the long-term run stability to a sufficient degree.

Thus, conventionally, it has long remained as an unsolved problem to suppress quality degradation of EVOH due to fish eyes and hart spots formed in a high-temperature molding process.

DISCLOSURE OF THE INVENTION

It is an object of the present invention to provide an ethylene-vinyl alcohol based copolymer whose long-term run stability in melt molding is improved as a result of enhancing the thermal stability of EVOH fundamentally so that fish eyes and hard spots can be suppressed in a heat treatment and a molding process.

As a result of assiduous studies, the present inventors have found that dissimilar structures that are contained in the molecular structure of EVOH, particularly carboxylic acids and lactone rings at terminal positions of the EVOH significantly impair the long-term run stability.

It is believed that in melt molding, the terminal carboxylic acids and the terminal lactone rings serve to produce a branched polymer having a high degree of polymerization by reacting with hydroxyl groups in the copolymer and as a result promote the formation of gel, hard spots, and the like that become the cause of fish eyes.

The present invention provides an EVOH, including ethylene units (III), vinyl alcohol units (IV) and vinyl ester units (V), characterized in that the proportion of the ethylene units (III) with respect to the total of the units (III+IV+V) is from 20 to 60 mole %, and the proportion of the total (I+II) of carboxylic acids units (I) and lactone ring units (II) in copolymer terminals with respect to the total (III+IV+V) of the units is 0.12 mole % or less, or preferably 0.10 mole % or less.

The present invention also provides a method for producing the foregoing EVOH. A first producing method according to the present invention is characterized by including, in producing the EVOH of the present invention, the steps of: saponifying an ethylene-vinyl ester based copolymer in which the proportion of ethylene units (III) with respect to the total (III+V) of the ethylene units (III) and vinyl ester units (V) is from 20 to 60 mole %, to obtain an EVOH; and reducing at least one substance selected from the ethylene-vinyl ester based copolymer and the EVOH by contacting the at least one substance with a reducing agent.

A second producing method according to the present invention is characterized by including, in producing the EVOH of the present invention, the steps of: copolymerizing ethylene and a vinyl ester so that the proportion of ethylene units (III) with respect to the total (III+V) of the ethylene units (III) and vinyl ester units (V) becomes 20 to 60 mole % to obtain an ethylene-vinyl ester based copolymer; and saponifying the ethylene-vinyl ester based copolymer to obtain an EVOH, wherein, in the step of copolymerizing, a polymerization temperature is set at −20° C. to 90° C., and a polymerization rate is set at 3% to 48% with respect to the vinyl ester.

The respective units (I) through (V) are represented by the following formulae:

where X is a hydrogen atom, a hydroxyl group, or an esterificated hydroxyl group, Y is a hydrogen atom, an alkali metal, or an alkaline earth metal, and R is a linear or branched alkyl group, preferably a methyl group, an ethyl group, an n-propyl group, an isopropyl group, a t-butyl group, or a trifluoromethyl group.

The present invention makes it possible to obtain an EVOH that does not easily form fish eyes or hard spots in a heat treatment and a molding process and that has good long-term run stability in melt molding.

BEST MODE FOR CARRYING OUT THE INVENTION

In the present invention, in order to produce an EVOH that is excellent in melt stability and has more desirable long-term run stability, it is preferable that the proportion of the vinyl ester units (V) with respect to the total (IV+V) of the vinyl alcohol units (IV) and the vinyl ester units (V) (hereinafter, the proportion is also referred to as an "amount of remaining acetyl groups") be 0.20 mole % or less, more preferably 0.1 mole % or less, and still more preferably 0.05 mole % or less.

According to the studies conducted by the present inventors, the amounts of remaining acetyl groups and 1,2-glycol, which are dissimilar structures existing in the molecular structure of EVOH, also affect the long-term run stability of EVOH. It is preferable that the amount of remaining acetyl groups and 1,2-glycol unit in EVOH satisfy the following expression:

$$G < 1.53 - 0.0239 \times Eu.$$

In the expression, G is a numerical value representing the content percent of 1,2-glycol amount, expressed as mole %, and Eu is a numerical value representing the proportion of the ethylene units (III) with respect to the total (III+IV+V) of the ethylene units (III), the vinyl alcohol units (IV), and the vinyl ester units (V), expressed as mole %.

The EVOH that satisfies the foregoing expression has good gas barrier properties and makes it possible to suppress fish eyes and hard spots in a heat treatment and a molding process.

In the EVOH, the proportion of the ethylene units represented as (III/(III+IV+V)) (hereinafter also referred to as an "ethylene content") should preferably be 20 to 60 mole %, from the viewpoint of obtaining molded articles that are excellent in gas barrier properties and melt-moldability. If the ethylene content is less than 20 mole %, melt-moldability may become poor. If the ethylene content exceeds 60 mole %, gas barrier properties may become insufficient.

The lower limit value of the ethylene content should preferably be 22 mole % or greater, and more preferably 24 mole % or greater. The upper limit value of the ethylene content should preferably be 55 mole % or less, and more preferably 50 mole % or less.

It is preferable that the EVOH of the present invention have a short-chain branching content of 0.20 mole % or less, more preferably 0.16 mole % or less, and especially preferably 0.13 mole % or less.

Herein, the term "short-chain branching content" means an amount of terminal alkyl groups that have a branched structure from its main chain and have 4 to 6 carbon atoms.

When the short-chain branching content exceeds the foregoing range, long-term run stability degrades in a heat treatment and a molding process, easily forming fish eyes and hard spots.

In the first producing method according to the present invention, the reducing agent may be brought into contact with the ethylene-vinyl ester based polymer prior to the saponification, or the reducing agent may be brought into contact with the EVOH obtained through the saponification. It is also possible to bring the reducing agent into contact with both the ethylene-vinyl ester based polymer and the EVOH.

It is preferable that the contacting of the reducing agent with the ethylene-vinyl ester based copolymer and/or the ethylene-vinyl alcohol based copolymer be performed in an organic solvent.

In this case, there are no restrictions on the organic solvent as long as it can dissolve the copolymer and the reducing agent, and preferable examples include DMF, DMSO, diethylene glycol dimethyl ether, triethylene glycol dimethyl ether, ethyleneglycol dimethylether, methanol, ethanol, propyl alcohol, THF, and hexafluoroisopropanol, either alone or a mixture of two or more of them.

Although there are no restrictions on the reducing agent as long as the reducing agent is a compound that can reduce carbonyl compounds, such as ketones, aldehydes, carboxylic acids, and esters, a reducing agent that can easily be removed by water washing or the like after the reduction is preferred. Specifically, it is recommended to use triethylamine borane, sodium hydroborate, lithium aluminum hydride, and the like.

It is recommended that the reducing agent be used in the range of from 0.001 weight % to 100 weight % with respect to the copolymer. The lower limit of the amount is preferably 0.01 weight % or greater with respect to the copolymer, and particularly preferably 0.1 weight % or greater. The upper limit of the amount is preferably 80 weight % or less, and particularly preferably 60 weight % or less. If the amount of the reducing agent used is less than 0.001 weight %, the efficiency in the reduction is poor and it is unable to reduce the amount of terminal carboxylic acid in the copolymer cannot sufficiently. On the other hand, if the amount of the reducing agent used exceeds 100 weight %, it becomes difficult to extract the reducing agent from the copolymer, the thermal stability, the color tone, and the like may degrade.

Generally, the temperature at which the copolymer is brought into contact with the reducing agent is preferably in the range of 0° C. to 300° C., more preferably 30° C. to 250° C., and still more preferably 50° C. to 150° C., although it may depend on the type and amount of the reducing agent and the type of the solvent.

It is preferable that the contacting of the copolymer and the reducing agent be carried out in a nitrogen atmosphere.

As set forth in the second producing method according to the present invention, in order to obtain a desired range of the carboxylic acid and the lactone ring at the terminal of the polymer in the EVOH, it is advisable to set a polymerization temperature to be from −20° C. to 90° C. when the polymerization rate is from 3% to 48% with respect to vinyl ester. The polymerization temperature is more preferably from 0° C. to 50° C., although it depends on the polymerization rate.

Moreover, in order to control the amount of 1,2-glycol in the copolymer to be within the preferable range as specified above by a polymerization condition, the polymerization temperature should preferably be less than 50° C., and more preferably 45° C. or less, although the polymerization temperature is not necessarily limited since it may also depend on the polymerization rate. The lower limit of the polymerization temperature is affected by the activity of the catalyst used and is not particularly limited from the viewpoint of long-term run stability of the copolymer obtained, it is generally preferable that the lower limit of the polymerization temperature be 0° C. or higher from the viewpoint of productivity of the copolymer.

The polymerization rate should preferably be 45% or less, and particularly preferably be 40% or less.

Although the polymerization time may be determined according to the polymerization temperature, the catalyst concentration, the monomer concentration, the target polymerization rate, the target polymer concentration, and the like, it is preferable that the polymerization time be 7 hours or less, and more preferably 6 hours or less, from the viewpoint of productivity and in respect that it is important that the rate of polymerization of the copolymer, in other words, the ratio of the polymerization rate with respect to the polymerization time fall within a fixed range. On the other hand, from the viewpoint that the temperature increase due to the heat in the polymerization needs to be suppressed to control the polymerization reaction to be stable, it is preferable that the polymerization time be 1 hour or longer, and more preferably 2 hours or longer. Thus, in order to attain both stability in controlling the polymerization reaction and good productivity, the polymerization time should preferable be within the range of from 1 hour to 7 hours.

It should be noted, however, that the EVOH according to the present invention is not limited to those obtained by the methods according to the present invention.

It is recommended that EVOH be obtained by saponifying ethylene-vinyl ester based copolymer obtained through copolymerizing ethylene and a vinyl ester, and it is preferable that EVOH be obtained by saponifying ethylene-vinyl acetate copolymer (hereinafter also referred to as "EVAc").

Polymerization of ethylene and vinyl acetate is not limited to a solution polymerization, and it is possible to employ any one of any solution polymerization, suspension polymerization, emulsion polymerization, and bulk polymerization. Moreover, the polymerization may be performed by either a continuous process or a batch process.

Polymerization conditions for the solution polymerization are as follows.

Solvent: Preferable examples include alcohols, such as methyl alcohol, ethyl alcohol, propyl alcohol, n-butyl alcohol, and t-butyl alcohol. Especially preferable is methyl alcohol. (It is also possible to use, other than alcohols, an organic solvent capable of dissolving ethylene, vinyl acetate, and ethylene-vinyl acetate copolymer (for example, dimethylsulfoxide).)

Catalyst: Examples include azo initiators such as 2,2'-azobisisobutylnitrile, 2,2'-azobis-(2,4-dimethylvaleronitrile), 2,2'-azobis(2-methylpropionitrile), 2,2'-azobis-(4-methyl-2,4-dimethylvaleronitrile), 2,2'-azobis-(4-methoxy-2,4-dimethylvaleronitrile), and 2,2'-azobis-(2-cyclopropylpropionitrile), and organic peroxide-based initiators such as isobutyryl peroxide, cumyl peroxyneodecanoate, diisopropyl peroxycarbonate, di-n-propylperoxydicarbonate, t-butylperoxyneodecanoate, lauroyl peroxide, dicyclohexylperoxydicarbonate, benzoyl peroxide, and t-butyl hydroperoxide.

Temperature: −20° C. to 90° C., preferably 0° C. to 80° C., and more preferably 0° C. to 50° C. In cases where productivity is seen as important, a generally preferable temperature range is 20° C. to 70° C.

Time (Average residence time in the case of continuous process): 1 to 15 hours, preferably 1 to 7 hours. In cases where the characteristics need not be controlled by the polymerization time, the time may be 3 to 11 hours.

Polymerization rate: 3% to 48% with respect to the vinyl ester charged, preferably 3% to 45%. In cases where productivity is seen as important, a generally preferable range of polymerization rate is from 5% to 90%, and more preferably from 30% to 80%.

Resin content in the solution after polymerization: 5% to 85%, preferably 20% to 70%.

Ethylene content in the copolymer: 20 to 60 mole %, preferably 22 to 55 mole %, more preferably 24 to 50 mole %.

In addition to ethylene and vinyl acetate, it is possible to contain a monomer that can copolymerize with ethylene and vinyl acetate in a small amount. Examples of the monomer include: α-olefins such as propylene, isobutylene, α-octene, and α-dodecen; unsaturated acids such as acrylic acid, methacrylic acid, crotonic acid, maleic acid, and itaconic acid, as well as anhydrides thereof, salts thereof, and mono or dialkyl esters thereof, nitrils such as acrylonitrile and methacrylonitrile; amides such as acrylamide and methacrylamide; olefin sulfonic acids such as ethylene sulfonic acid, allylsulfonic acid, and methallylsulfonic acid, as well as salts thereof, alkyl vinyl ethers, vinyl ketone, N-vinyl pyrrolidone, γvinyl chloride, and vinylidene chloride.

The EVOH may contain a vinylsilane compound as a copolymerizable component. A desirable content of the vinylsilane compound is 0.0002 to 0.2 mole %. Here, examples of the vinylsilane compound include: vinyltrimethoxysilane, vinyltriethoxysilane, vinyltri(β-methoxy-ethoxy)silane, and γ-methacryloxypropylmethoxysilane, and preferable are vinyltrimethoxysilane and vinyltriethoxysilane.

Subsequent to the polymerization for a predetermined time, a polymerization inhibitor is added as needed after a predetermined polymerization rate is reached, then unreacted ethylene gas is removed by evaporation, and thereafter, unreacted vinyl acetate is purged away. For purging unreacted vinyl acetate away from the EVAc solution thus obtained, the following method may be employed, for example. The EVAc solution is continuously supplied from a top portion of a column filled with Raschig rings at a constant rate, and a vapor of an organic solvent such as methanol is blown from a lower portion of the column so that a mixed vapor of unreacted vinyl acetate and the organic solvent such as methanol is distilled from the top portion of the column while an EVAc solution from which the unreacted vinyl acetate has been removed is taken out from the lower portion of the column.

An alkali catalyst is added to the EVAc solution from which the unreacted vinyl acetate has been removed so that the vinyl acetate portion in the copolymer is saponified. The method for the saponification may be either a continuous process or a batch process. Usable as the alkali catalyst are sodium hydroxide, potassium hydroxide, alkali metal alcoholate, and the like. A preferable solvent used for the saponification is methanol.

An example of saponification conditions are as follows.

Concentration of the copolymer solution: 10% to 50%

Reaction temperature: 30° C. to 150° C.

Amount of catalyst used: 0.005 to 0.6 equivalent weight (to the vinyl acetate component)

Time (Average residence time in the case of continuous process): 10 minutes to 6 hours Generally, a continuous process can remove the methyl acetate produced by the saponification more efficiently and is therefore capable of obtaining a resin having a higher saponification degree with a less amount of catalyst than a batch process. In the case of continuous process, the saponification needs to be performed at a higher temperature in order to prevent precipitation of the EVOH formed by the saponification. For this reason, the reaction temperature and the catalyst amount in the following ranges are preferable in the continuous process.

Reaction temperature: 70° C. to 150° C.

Amount of catalyst used: 0.005 to 0.4 equivalent weight (to the vinyl acetate component)

As described above, the amount of remaining acetyl groups in the EVOH should be smaller in order to produce EVOH that has excellent melt stability and good long-term run stability. To obtain an EVOH in which the amount of remaining acetyl groups is 0.1 mole % or less, it is preferable to use a continuous process, and moreover, it is advisable that, for example, the catalyst be added from a plurality of locations in the saponification reaction column, that the amount of the catalyst used be increased, or that the amount of the methanol blown from a lower portion of the saponification reaction column be increased. Even with the use of a batch process, it is possible to obtain an EVOH in which the amount of remaining acetyl groups is 0.1 mole % or less. For this purpose, it is advisable to add the catalyst at a plurality of times, to increase the amount of the catalyst used, or to increase the amount of methanol vapor or nitrogen gas blown into the saponification reactor, for example.

EVOH pellets may be produced from the alcohol solution of EVOH after the saponification. The method therefor is not particularly limited. For example, wet pellets can be obtained by introducing the alcohol solution of EVOH in a coagulation bath, which is an aqueous alcohol solution containing a small amount of water or alcohol, preferably an alcohol-containing aqueous solution containing 5 to 20 weight % of alcohol taking coagulation property and processability into consideration, although the content may depend on the ethylene content in the EVOH, to precipitate EVOH in a strand form and thereafter cutting the resultant strands.

In advance of the precipitation, the concentration of EVOH may be made higher than that at the time of the saponification by condensing the alcohol solution, or alternatively, a solution of EVOH in a water/alcohol mixture or an aqueous composition of EVOH may be prepared by substituting part or the whole of methanol with water. It is also possible to produce pellets by cutting the solution or composition still in a flowing condition without causing EVOH to precipitate in a strand-like form and solidifying it in water.

The wet pellets thus obtained are porous, and thus it is easy to remove the saponification catalyst residue and the reducing agent residue by water washing, facilitating addition of additives and a drying operation that follow. To obtain these advantages sufficiently, it is preferable that the wet pellets have a water content of 10 to 80 weight %. The water content may more preferably be 20 weight % or higher, particularly preferably 30 weight % or higher, but may more preferably be 70 weight % or less, particularly preferably 60 weight % or less.

The wet pellets usually contain an alkali metal salt such as sodium acetate, which is a saponification catalyst residue, and for that reason, a problem such as coloring may arise. In order to prevent such a problem, it is preferable that the wet pellets be washed. Generally, the wet pellets before the washing have an alkali metal salt content of about 100 to 10000 µmol/g (per EVOH weight) in terms of alkali metal. Although the method of the washing is not particularly limited, washing with water is desirable. In order to remove the alkali metal ions efficiently, an aqueous solution of acid such as acetic acid may be used. Moreover, washing with water and washing with acid may be used together to reduce the content of the saponification catalyst residue efficiently.

In the washing, it is advisable to reduce the content of alkali metal in the wet pellets to 0 to 50 µmol/g (per EVOH weight) or less in terms of alkali metal. The upper limit of the content of alkali metal is 40 µmol/g or less, more preferably 30 µmol/g or less, and particularly preferably 20 µmol/g or less. Since the saponification catalyst residue is usually contained as an alkali metal salt of acetic acid, it becomes easy to obtain an EVOH resin composition with a reduced carboxylic acid radical content by sufficiently reducing the content of alkali metal in the wet pellets after washing.

The method for washing the wet pellets is not particularly limited, and the wet pellets may be washed using either a batch-type process vessel or a continuous-type process vessel. However, a method in which pellets are treated within a column vessel while the pellets are being continuously supplied is preferable from the viewpoint of productivity.

Various kinds of additives may be added to the EVOH of the present invention to improve the thermal stability, the long-term run stability, the color tone, the adhesiveness, and so forth of the molded product. The additives may be selected as appropriate among alkali metal salts (A), boron compounds (B), carboxylic acids or salts thereof (C), phosphate compounds (D), alkaline earth metal salts (E), a carbon dioxide gas, and the like, according to the purposes.

Illustrative examples of the method of adding additives include methods of adding the additives to EVOH directly, splaying the additives to EVOH, kneading the additives and EVOH with an extruder or the like, adding the additives to a solution of EVOH, and treating EVOH with a solution containing the additives in a non-homogeneous system. Among these methods, the method of contacting an aqueous solution of the additives with EVOH is preferable.

Addition of an alkali metal salt (A) is preferable from the viewpoint of improving the interlayer adhesiveness and long-term run stability of EVOH. A preferable range of the content of the alkali metal salt (A) is generally from 0.05 to 40 mmol/L, although it may depend on the water content of the wet pellets. A more preferable lower limit of the content is 0.1 mmol/L or greater, while a more preferable upper limit thereof is 20 mmol/L or less.

A treatment with an aqueous solution containing an alkali metal salt (A) yields an EVOH resin composition containing the alkali metal salt. The alkali metal concentration in this resin composition is preferably from 10 to 1000 ppm, and particularly preferably from 20 to 500 ppm.

The cationic species of the alkali metal salt (A) may be selected as appropriate from lithium salts, sodium salts, potassium salts, rubidium salts, and cesium salts. Preferable are sodium salts and potassium salts, and especially preferable potassium salts.

The anionic species of the alkali metal salt (A) are not particularly limited either, and it may be added as carbonate, hydrogen carbonate, phosphate, hydrogen phosphate salt, hydroxide, carboxylic acid salt, and the like. It is recommended that the alkali metal salt be added as carbonate, hydrogen carbonate, hydrogen phosphate salt, and hydroxide. Alternatively, as will be described later, it may be added as borate salt. It is advisable to avoid the use of carboxylic acid salts when particularly good long-term run stability and thermal stability are required.

Addition of a boron compound (B) is preferable from the viewpoint of improving the long-term run stability and so-called "die build-up formation" on die lips in melt molding. It is also possible to control the MI of the resin composition by the amount of the boron compound added. When the concentration of the boron compound (B) is controlled to be 0.1 to 50 mmol/L in term of boron element in an aqueous solution for adding the boron compound, it is possible to allow dry resin composition pellets to contain an appropriate amount of the boron compound (B). The lower limit value of the concentration of the boron compound (B) in the aqueous solution is preferably 0.5 mmol/L or greater, and more preferably 1 mmol/L or greater. The upper limit value of the foregoing concentration is 40 mmol/L or less, and more preferably 30 mmol/L or less. If it exceeds 50 mmol/L, the EVOH resin composition tends to cause gelation easily and the appearance of the molded product may degrade.

Examples of the boron compound (B) include, but are not limited to, boric acids, boric acid esters, borate salts, and boron hydrides. More specifically, examples of the boric acids include orthoboric acids, metaboric acids, and tetraboric acids; examples of the boric acid esters include triethyl borate and trimethyl borate; examples of the borate salts include alkali metal salts and alkaline earth metal salts of a variety of the above-mentioned boric acids, and borax. Among these compounds, orthoboric acids (hereinafter also simply referred to as "boric acids") are preferable.

Although the carboxylic acids or salts thereof (C) are not particularly limited, preferable examples of the carboxylic acids include alkylcarboxylic acids such as acetic acid, propionic acid, lactic acid, and butyric acid, and examples of the salts thereof include potassium salts, sodium salts, calcium salts, magnesium salts, and the like. Particularly preferable are acetic acid, sodium acetate, and potassium acetate.

When especially good long-term run stability and thermal stability are required, it is desirable that the carboxylic acids or salts thereof (C) be not added to the aqueous solution for treating EVOH, for example. However, this does not mean to exclude the possibility of dissolving carboxylic acids or salts thereof (C) remaining in the EVOH resin into the aqueous solution and consequently causing them to be contained therein. Likewise, it does not exclude the possibility of containing the carboxylic acids or salts thereof (C) within a range such that the advantageous effects of the present invention are not impaired.

Addition of a phosphoric acid compound (D) is preferable from the viewpoint of attaining a good balance between the long-term run stability, the coloring resistance, especially the coloring resistance in high-temperature molding in melt molding, and the interlayer adhesiveness. Allowing EVOH to contain an appropriate amount of the phosphoric acid compound (D) makes it possible to suppress coloring of the molded article in melt molding the EVOH resin composition and forming of gel and hard spots. A preferable upper limit value of the concentration of the phosphoric acid compound (D) in an aqueous solution for adding the phosphoric acid compound (D) is 10 mmol/L or less in terms of phosphoric acid radical, more preferably 5 mmol/L or less, and especially preferably 2 mmol/L or less. On the other hand, a preferable lower limit value of the above-mentioned concentration is 0.01 mmol/L or greater in terms of phosphoric acid radical, more preferably 0.05 mmol/L or greater, and especially preferably 0.1 mmol/L.

Examples of the phosphoric acid compound (D) include various acids such as phosphoric acid and phosphorous acid, and salts thereof. The phosphoric acid salts may be any form among primary phosphate, secondary phosphate, and tertiary phosphate, and the cationic species thereof is not limited either, although alkali metal salts are preferable. In particular, desirable are sodium dihydrogen phosphate, potassium dihydrogen phosphate, disodium hydrogen phosphate, and dipotassium hydrogen phosphate.

An alkaline earth metal salt (E), if added at an appropriate amount, may improve the long-term run stability in melt molding the EVOH resin composition obtained. The aqueous solution for treating EVOH may contain the alkaline earth metal salt (E), but it is not desirable to add the alkaline earth metal salt (E) in a large amount because the alkaline earth metal salt tends to form low-solubility carbonates easily. When the concentration of the alkaline earth metal salt (E) in the aqueous solution is set at 0 to 10 mmol/L in terms of alkaline earth metal, an appropriate amount of the alkaline earth metal salt (E) can be contained in the dry resin composition pellets. The upper limit value of the foregoing concentration is preferably 5 mmol/L or less, and more preferably 3 mmol/L or less.

Examples of the cationic species of the alkaline earth metal salt (E) include, but are not particularly limited to, magnesium salts, calcium salts, barium salts, and strontium salts, and desirable are magnesium salts and calcium salts. The anionic species of the alkaline earth metal salt (E) are not particularly limited either, and it may be added as carbonates, hydrogen carbonates, phosphates, hydrogen phosphate salts, hydroxides, carboxylic acid salts, and the like. It is preferable that the alkaline earth metal salt be added as carbonates, hydrogen carbonates, hydrogen phosphate salts, and hydroxides. Although many of the alkaline earth metal salts show poor solubility with water, the solubility becomes large due to the presence of carbonic acid. When particularly good long-term run stability and thermal stability are required, carboxylic acid salts are undesirable.

Although the amount of carbon dioxide gas contained in the aqueous solution for treating the EVOH is not particularly limited and may be adjusted as appropriate, it is preferable to dissolve an amount greater than such an amount of carbon dioxide gas that is present in the air can naturally dissolve therein. The concentration of the carbon dioxide gas in the aqueous solution (the total of free carbon dioxide and carbonic acid) is preferably 0.5 mmol/L or greater, more preferably 2 mmol/L or greater, and especially preferably 10 mmol/L or greater.

In order to increase the solubility of carbon dioxide gas, the process may be conducted under a pressurized condition of about 1.5 to 10 atm. In the case of processing pellets continuously using a continuous-type process vessel, particularly in the case of using a column-type vessel, too high a concentration of carbon dioxide gas in the aqueous solution can result in air bubbles around EVOH pellets, which can adversely affect sedimentation of the resin. For this reason, in the case where a continuous process is adopted, the concentration of carbon dioxide gas in the aqueous solution may be lower than the saturation concentration of carbon dioxide gas. In this case, the concentration of carbon dioxide gas is set to be lower than the saturation concentration of carbon dioxide gas, and it is desirable that the concentration be set at 0.95 times or less of the saturation concentration of carbon dioxide gas, and more preferably 0.9 times or less. On the other hand, in the case of using a batch-type process vessel, the problem with sedimentation does not arise usually, but the upper limit value of the concentration of carbon dioxide gas may be set at the same range as that for the continuous-type process vessel as described above.

The PH of the aqueous solution containing the above-described additives and further containing carbon dioxide gas for treating EVOH should desirably be from 3.5 to 7.0. By allowing the aqueous solution to contain carbon dioxide gas at a certain amount or greater, the solution can be made an acidic aqueous solution. The pH value is preferably 3.8 or greater, and more preferably 4 or greater but preferably 6.8 or less, more preferably 6.5 or less, and especially preferably 6.0 or less.

The method for preparing the aqueous solution is not particularly limited. In the case of using carbon dioxide gas, the above-mentioned additives may be added to an aqueous solution in which carbon dioxide gas has been dissolved in advance, or carbon dioxide gas may be dissolved into an aqueous solution in which the additives have been dissolved in advance. It is also possible to prepare the respective aqueous solutions in advance and then mix them together.

Although the method of contacting EVOH with the aqueous solution is not particularly limited, it is recommended to dip EVOH into the aqueous solution. The configuration of the EVOH at the time when the EVOH resin is dipped into the aqueous solution may be any shapes, such as powdery state, granular state, spherical state, and columnar pellet state, but the wet EVOH pellet state obtained in the above-described manner is preferable. Dipping pellets in a water-containing state into an aqueous solution allows the additives to be contained in the pellets efficiently and uniformly. It is desirable that the water content of the wet pellets prior to the dipping into the aqueous solution be 10 to 80 weight %. The water content is preferably 20 weight % or greater, more preferably 30 weight % or greater, but 75 weight % or less, more preferably 70 weight % or less.

Although the temperature of the aqueous solution that is brought into contact with EVOH is not particularly limited, it is preferable that the temperature be from 10° C. to 90° C. when the aqueous solution contains carbon dioxide gas. If the temperature is less than 10° C., it takes a long time to make the additive component to be contained in the EVOH pellets uniformly. If the temperature exceeds 90° C., the saturation solubility of carbon dioxide gas reduces, making a sufficient amount of carbon dioxide gas unable to be contained in the aqueous solution, and moreover the pellets might be heat-bonded one another. The temperature of the aqueous solution is preferably 20° C. or higher, more preferably 30° C. or higher, but 85° C. or less, more preferably 80° C. or less. In the case of using an aqueous solution at 70° C. or higher, it is recommended that the contacting be made under a pressure of about 1.5 to 10 atm because the solubility of carbonic acid becomes small.

Although a preferable range of the time for contacting EVOH with the aqueous solution varies depending to the configuration of EVOH, it is advisable that the time be 1 hour or longer, and more preferably 2 hours or longer, in the case of the pellets having a diameter of about 1 to 10 mm.

The method for contacting EVOH with the aqueous solution is not particularly limited. It is possible to bring EVOH into contact with water, and thereafter dissolve carbon dioxide gas and additives into the water. Contacting EVOH with an aqueous solution that has been adjusted in advance is preferable because an EVOH resin composition containing the additives uniformly and thus having stable quality can be obtained.

Either a batch process or a continuous process may be adopted as the method for contacting EVOH with the aqueous solution. An example of a desirable continuous process is a method in which in a column-type vessel, EVOH is brought into contact with a continuously supplied aqueous solution while EVOH is being moved downward gradually.

It is also possible to prepare a plurality of aqueous solutions and contact EVOH with the aqueous solutions at a plurality of times separately. For example, it is possible to adopt a method of first contacting EVOH with an aqueous solution containing only an alkali metal salt (A) or a boron compound (B) and subsequently contacting EVOH with an aqueous solution containing carbon dioxide gas in addition to the alkali metal salt (A) or the boron compound (B).

The EVOH to which the additive has been added using an aqueous solution, desirably the EVOH in a pellet form, is drained and thereafter dried. The method of drying is not particularly limited and may be performed using a hot air dryer or the like. The dryer may be either a fluidized dryer or a stationary drier, or these driers may be used in combination. Above all, desirable is a method in which EVOH is first dried by fluidized drying and subsequently by ventilation drying. The temperature of drying is not particularly limited but is preferably about 70° C. to 120° C. The temperature may be elevated as the drying proceeds. The water content after the drying is preferably 1 weight % or less, and more preferably 0.5 weight % or less. The dry EVOH resin thus obtained is used for the subsequent molding process.

Thus, an EVOH resin composition can be obtained. The EVOH resin composition may contain various additives, and it is preferable that the EVOH resin composition contain 10 to 1000 ppm of an alkali metal salt in terms of metal.

A desirable melt flow rate (MFR) of the EVOH resin composition (measured at 190° C. with 2160 g weight; for those having a melting point of about 190° C. or higher than 190° C., the MFR at 190° C. is extrapolated by measuring melt flow rates at a plurality of temperatures with 2160 g weight and plotting reciprocals of the absolute temperatures on the horizontal axis and the melt flow rates on the vertical axis (logarithm) in a semilogarithmic graph) is desirably 0.1 to 200 g/10 min. The lower limit of the MFR is more desirably 0.2 g/10 min. or greater, still more desirably 0.5 g/10 min. or greater, and most desirably 1 g/10 min. or greater. The upper limit of the MFR is more desirably 50 g/10 min. or less, still more desirably 30 g/10 min. or less, and most desirably 15 g/10 min. or less. If the melt flow rate is less than the foregoing range, the interior of the extruder will be brought into a high torque condition during molding, making the extrusion process difficult. If the melt flow rate is greater than the foregoing range, the mechanical strength of the molded article will be insufficient and therefore undesirable.

It is advisable that the intrinsic viscosity of the EVOH or the EVOH resin composition (hereinafter, the term "EVOH resin composition" is meant to include EVOH in the description about its properties and processing) should be selected from the range of 0.03 to 1.5 dL/g, more preferably the range of 0.05 to 1.0 dL/g, and still more preferably the range of 0.07 to 0.8 dL/g. If the intrinsic viscosity is lower than the foregoing range, the melt-moldability is poor and the film obtained through extrusion molding tends to have thickness variations. If the intrinsic viscosity is greater than the foregoing range, the appearance of the molded article tends to degrade easily.

It is also possible to blend the EVOH resin composition with an EVOH having a degree of polymerization, an ethylene content, and an amount of remaining acetyl groups that are different from the EVOH resin composition and melt molding. Moreover, it is possible to add various other plasticizers, lubricants, stabilizers, surfactants, coloring agents, UV absorbers, antistatic agents, desiccating agents, crosslinking agents, metal salts, fillers, reinforcing agents such as various fibers, and the like at an appropriate amount. They are desirably supplied in a melt-molding process in the form of pellets.

The EVOH resin composition is molded into various molded articles such as films, sheets, containers, pipes, and fibers by melt molding. Among them, the films are suitable as an application for using the EVOH resin composition according to the present invention because they require a long-time molding in many cases and gels and hard spots, which tend to occur as a problem in long-run molding, are easily noticeable as a problem in appearance.

These molded articles can be crushed and again molded for the purposes of recycling. In addition, the films, the sheets, the fibers, and the like can be formed by uniaxial or biaxial stretching. Usable as melt molding are extrusion molding, inflation extrusion, blow molding, melt spinning, injection molding, and the like. A preferable melt temperature is about 150° C. to 270° C. although it may vary depending on the melting point or the like of the copolymer.

The EVOH resin composition is usable as a molded article composed of a single layer made of only the resin composition, but since it has good interlayer adhesiveness, it is desirable to form a multilayer structure including at least one layer made of the resin composition. Examples of a layer construction of the multilayer structure include, but are not limited to, E/T, T/E/T, E/Ad/T, T/Ad/E/Ad/T, wherein E denotes the EVOH resin composition of the present invention, Ad denotes an adhesive resin, and T denotes a thermoplastic resin. Each of the layers shown here may be either a single layer or multiple layers in some cases.

The method for producing the multilayer structure as described above is not particularly restricted. Various methods are possible, which include: a method of melt-extruding a thermoplastic resin on a molded article (a film, a sheet, or the like) made of the EVOH resin composition; conversely, a method of co-extruding the resin composition of the present invention and another thermoplastic resin a substrate made of a thermoplastic resin or the like; a method of co-extruding or co-injecting a thermoplastic resin and the EVOH resin composition; and further, a method of laminating a molded article obtained from the EVOH resin composition and a substrate of another film or sheet using a known adhesive, such as an organic titanium compound, an isocyanate compound, and a polyester-based compound. Particularly, the method of co-extruding or co-injecting is desirable.

Suitable examples of the method of co-extrusion molding of the EVOH resin composition and a thermoplastic resin include, but are not particularly limited to, a multi-manifold flow-combining type T-die process, a feedblock flow-combining type T-die process, and an inflation process. The method of the co-injection molding is not particularly limited either and may employ general techniques.

Examples of the thermoplastic resin used for laminating with the EVOH resin composition include: homopolymers or copolymers of olefins such as linear low density polyethylene, low density polyethylene, medium density polyethylene, high density polyethylene, ethylene-vinyl acetate copolymer, ethylene propylene copolymer, polypropylene, propylene-α-olefin copolymer (α-olefin having 4 to 20 carbon atoms), polybutene, and polypentene; polyesters such as polyethylene terephthalate; polyester elastomer; polyamide resins such as nylon-6 and nylon-6,6; polystyrene; polyvinyl chloride; polyvinylidene chloride; acryl-based resin; vinyl ester-based resin; polyurethane elastomer; polycarbonate; chlorinated polyethylene; and chlorinated polypropylene. Preferably used among the foregoing are polypropylene, polyethylene, ethylene propylene copolymer, ethylene-vinyl acetate copolymer, polyamide, polystyrene, and polyester.

When laminating the EVOH resin composition and a thermoplastic resin, there are cases in which an adhesive resin is used, in which case an adhesive resin made of carboxylic acid-modified polyolefin is preferable as the adhesive resin. Herein, the carboxylic acid-modified polyolefin refers to a modified olefinic polymer containing a carboxyl group, obtained by chemically bonding (for example, by an addition reaction or a grafting reaction) ethylenic unsaturated carboxylic acid or anhydride thereof to an olefinic copolymer. The term "olefinic copolymer" herein means to include polyolefins such as polyethylene (low pressure, medium pressure, high pressure), linear low density polyethylene, polypropylene, and polybutene; and copolymers of olefins and comonomers capable of copolymerizing with the olefins (vinyl ester, unsaturated carboxylic acid ester, and the like), such as ethylene-vinyl acetate copolymer and ethylene ethyl acrylate copolymer. Preferable among them are linear low density polyethylene, ethylene-vinyl acetate copolymer (with the content of vinyl acetate being 5 to 55 weight %), and ethylene ethyl acrylate copolymer (with the content of ethyl acrylate being 8 to 35 weight %), and especially preferable are linear low density polyethylene and ethylene-vinyl acetate copolymer. Examples of the ethylenic unsaturated carboxylic acid and anhydride thereof include ethylenic unsaturated monocarboxylic acids, esters thereof, ethylenic unsaturated dicarboxylic acids, mono- or di-esters thereof, and anhydrides thereof, and among them, ethylenic unsaturated dicarboxylic acid anhydride is desirable. Specific examples include maleic acid, fumaric acid, itaconic acid, maleic anhydride, itaconic anhydride, monomethyl maleate, monoethyl maleate, diethyl maleate, and monomethyl fumarate, and in particular, maleic anhydride is desirable.

The amount of the ethylenic unsaturated carboxylic acid or anhydride thereof to be added or grafted to an olefinic copolymer (modification degree) is 0.01 to 15 weight % with respect to the olefinic copolymer, and more preferably 0.02 to 10 weight %. The addition reaction and grafting reaction of the ethylenic unsaturated carboxylic acid and anhydride thereof with an olefinic copolymer can be attained, for example, by radical polymerization in the presence of a solvent (xylene or the like) and a catalyst (peroxide or the like). It is preferable that the melt flow rate (MFR) of the carboxylic acid-modified polyolefin thus obtained, measured at 190° C. with 2160 g weight, be 0.2 to 30 g/10 minutes, and more preferably 0.5 to 10 g/10 minutes. These adhesive resins may be used either alone or in a mixture of combinations of two or more kinds.

By subjecting the co-extruded multilayer structure or the co-injected multilayer structure to secondary processing, various molded products (films, sheets, tubes, bottles, etc.) may be obtained. Examples include the following.

(1) Multilayer co-stretched sheets or films produced by uniaxially or biaxially stretching multilayer structures (sheets, films, etc.) and thermally treating them as needed (2) Multilayer pressure-rolled sheets or films produced by pressure-rolling multilayer structures (sheets, films, or the like)

(3) Multilayer tray/cup-shaped containers produced by thermoforming multilayer structures (sheets, films, or the like), such as by vacuum forming, pressure forming, and vacuum-pressure forming (4) Bottle- or cup-shaped containers produced by stretch blow molding or the like of multilayer structures (pipes or the like)

(5) Bottle-shaped containers produced by biaxially stretching molding or the like of multilayer structures (parisons or the like)

There are no particular restrictions on such methods of secondary processing, and various known method of secondary processing may also be employed. The co-extruded multilayer structure or the co-injected multilayer structure thus obtained exhibits outstanding interlayer adhesiveness, good appearance, and suppressed odor generation, and is therefore suitable as a material for various food containers, for example, a material for packaging films, deep-drawn containers, cup-shaped containers, bottles, and the like.

EXAMPLES

Hereinbelow, the present invention is further detailed with reference to Examples and Comparative Examples. The method of measuring characteristic values and the method of evaluation are as follows.

(1) Quantification of Primary Structure of EVOH (NMR Method)

Measurement Conditions

Name of equipment: Superconducting nuclear magnetic resonance analyzer Lambda 500, made by JEOL Observation frequency: 500 MHz (1H), 125.6 MHz (13C)

Solvent: DMSO-D6, water/methanol (4:6)

Polymer concentration: 4 wt % (H-NMR), 10 wt % (C-NMR)

Measurement temperature: 95° C. (H-NMR, C-NMR), 40° C. (H-NMR)

Number of times of integration: 600 (H-NMR), 50000 (C-NMR)

Figure 1:
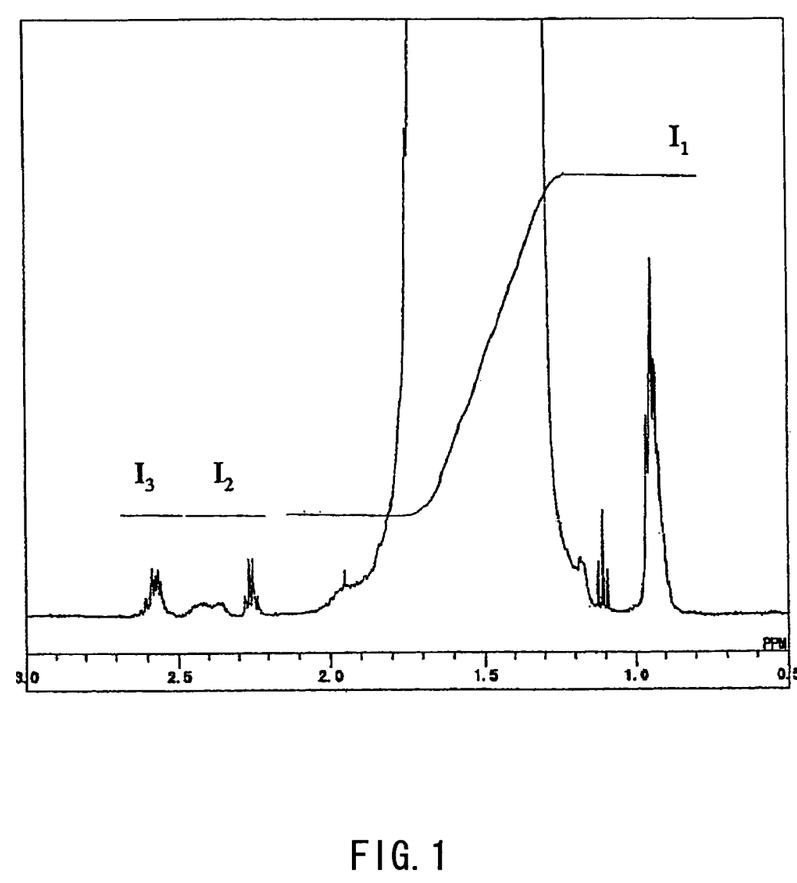
FIG. 1 is one typical example of a chart obtained though a H-NMR measurement for a typical EVOH.

Pulse interval: 4 seconds (H-NMR), 3 seconds (C-NMR)
Rotational speed of sample: 10 to 12 Hz
Analysis Method (1-1) Measurement of Amount of Terminal Carboxylic Acid and Terminal Lactone Ring The amount of terminal carboxylic acid and lactone ring, which are the carboxylic acid and lactone ring in polymer terminals, were obtained using a H-NMR measurement (measured at 80° C. with a water/methanol solvent). (The chemical shift values were based on the TMS peak set at 0 ppm.) As shown in the chart of FIG. 1, the amount of the terminal carboxylic acid and lactone ring was calculated using an integral value ($I_1$) for methylene hydrogen from 0.7 to 2.0 ppm, an integral value ($I_2$) of the peaks from 2.2 to 2.5 ppm, and an integral value ($I_3$) of the peaks from 2.5 to 2.65 ppm from Equation 1 below. Herein, the integral values ($I_2$) and ($I_3$) concerns with the peaks originating from the terminal carboxylic acid and lactone ring. Et in the following equation denotes ethylene content.

$$\text{Amount of terminal carboxylic acid and lacton ring (mole\%)} = \frac{(Et+100)(2I_2+I_3)}{200I_1+(2I_2+I_3)/2} \times 100 \quad \text{(Eq. 1)}$$

In FIG. 1, the integral value ($I_1$) originates from the hydrogen in all the $CH_2$ units contained in ethylene units (III), vinyl alcohol units (IV), and vinyl ester units (V). The integral value ($I_2$) originates from the hydrogen in the $CH_2$ units adjacent to the carboxyl groups of terminal carboxylic acids units (I). The integral value ($I_3$) originates from the hydrogen in the $CH_2$ units adjacent to the carbonyl groups of terminal lactone ring units (II).

(1-2) Measurement of Amount of Remaining Acetyl Groups

Figure 2:
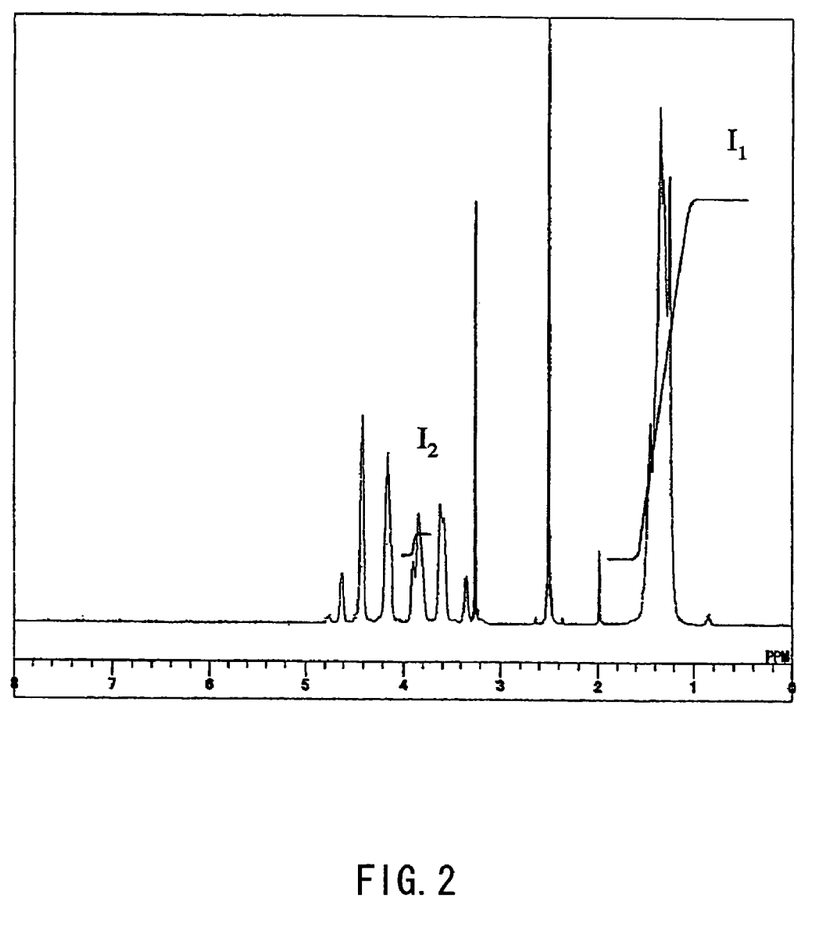
FIG. 2 is another example of the chart obtained though the H-NMR measurement for the typical EVOH.
Figure 3:
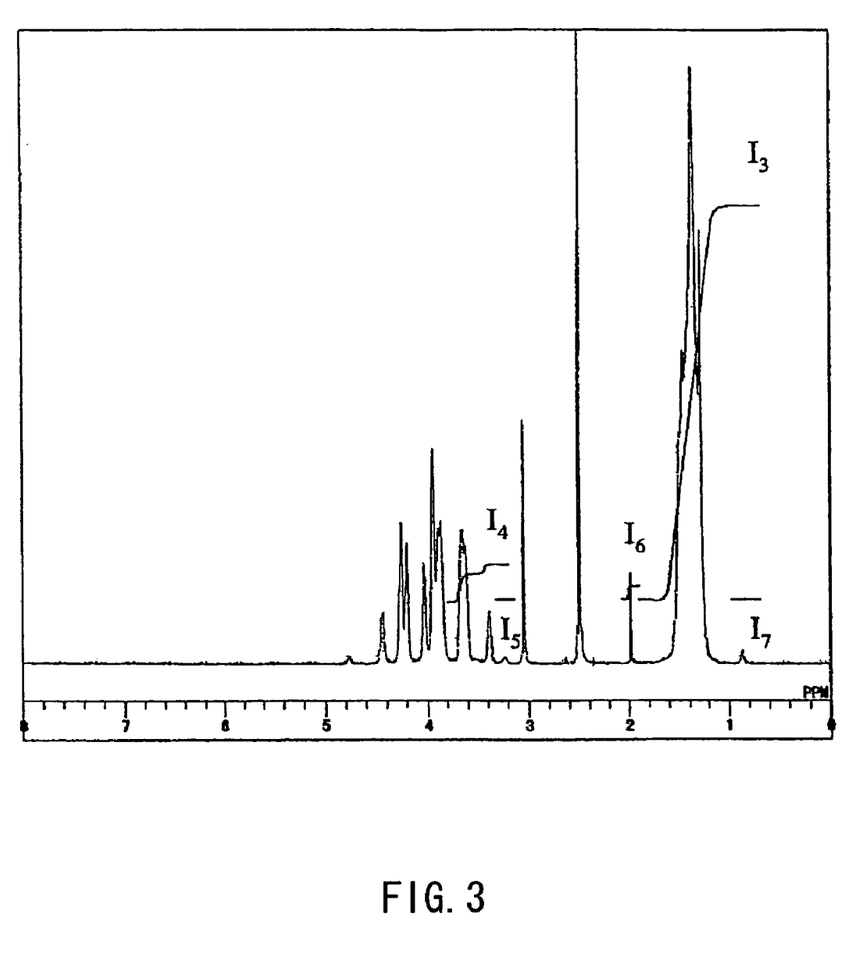
FIG. 3 is still another example of the chart obtained through the H-NMR measurement for the typical EVOH.

The amount of remaining acetyl groups was calculated using a H-NMR measurement (measured at 40° C. and 95° C. with DMSO solvent). (The chemical shift value was obtained based on the peak for the solvent at 2.5 ppm.) As shown in the charts of FIGS. 2 and 3, respective integral values were obtained with reference to integral values ($I_1$) and ($I_3$) for methylene hydrogen from 0.7 to 2.0 ppm. The amount of remaining acetyl groups was calculated from Equation 2 below, using an integral value ($I_2$) of the peaks from 3.7 to 4.0 ppm in FIG. 2, an integral value ($I_4$) of the peaks from 3.1 to 3.7 ppm in FIG. 3, and an integral value ($I_6$) of the peaks from 1.9 to 2.1 ppm in FIG. 3.

$$\text{Amount of remaining acetyl groups (mole\%)} = \frac{I_5/3I_3}{I_2/I_1+(3I_4+I_6)/3I_3} \times 100 \quad \text{(Eq. 2)}$$

In FIGS. 2 and 3, the integral values ($I_1$) and ($I_3$) originate from the same hydrogen as with the integral value ($I_1$) of FIG. 1; the integral value ($I_2$) originates from the methine hydrogen in the vinyl alcohol units (IV) (the methine hydrogen adjacent to vinyl alcohol on both adjacent sides of the unit); and the integral value ($I_4$) originates from the methine hydrogen in the vinyl alcohol units (IV) (the methine hydrogen adjacent to ethylene on both adjacent sides of the unit and that sandwiched by ethylene-vinyl alcohol); the integral value ($I_5$) originates from the methine hydrogen in the 1,2-glycol structure; the integral value ($I_6$) originates from the hydrogen in the methyl group corresponding to R in the vinyl ester units (V); and the integral value ($I_7$) originates from the hydrogen of the methyl group in the —$CH_2CH_3$ group existing at a EVOH terminal position.

(1-3) Method of Measuring Ethylene Content

The ethylene content was calculated using a H-NMR measurement (measured at 40° C. and 95° C. with DMSO solvent). (The chemical shift value was obtained based on the peak for the solvent at 2.5 ppm.) As shown in the charts of FIGS. 2 and 3, respective integral values were obtained with reference to the integral values ($I_1$) and ($I_3$) for methylene hydrogen from 0.7 to 1.8 ppm. Using the integral values ($I_1$), ($I_2$), ($I_3$), ($I_4$), ($I_5$), and ($I_6$) in FIGS. 2 and 3, the ethylene content was calculated from Equation 3 below.

$$\text{Ethylene content (mole\%)} = \frac{3I_1I_3 - 2I_1(3I_4+I_6) - 6I_2I_3}{3I_1I_3 + 2I_1(3I_4+I_6) + 6I_2I_3} \times 100 \quad \text{(Eq. 3)}$$

(1-4) Method of Measuring 1,2-glycol Amount

A 1,2-glycol amount was calculated using a H-NMR measurement (measured at 40° C. and 95° C. with DMSO solvent). (The chemical shift value was obtained based on the peak for the solvent at 2.5 ppm.) As shown in the charts of FIGS. 2 and 3, respective integral values were obtained with reference to the integral values ($I_1$) and ($I_3$) for methylene hydrogen from 0.7 to 2.0 ppm. Using the integral value ($I_5$) of the peaks for the methylene hydrogen from 3.1 to 3.2 ppm in FIG. 3, the 1,2-glycol amount was calculated from Equation 4 below. Et in the following equation denotes an ethylene content.

$$\text{1,2-glycol amount (mole\%)} = \frac{1200 I_1 I_5}{[3I_1I_3 + 2I_1(3I_4+I_6)+6I_2I_3](100+Et)} \times 100 \quad \text{(Eq. 4)}$$

(1-5) Method of Measuring Short-Chain Branching Content

The short-chain branching content is obtained from the amount of terminal methyl (—$CH_3$) having 4 to 6 carbon atoms and a branching structure branched from the main chain.

The short-chain branching content was calculated using both a H-NMR measurement (measured at 40° C. and 95° C. with DMSO solvent) and a C-NMR measurement (measured at 95° C. with DMSO solvent). (The chemical shift value was obtained based on the peak for the solvent at 2.5 ppm in the H-NMR and based on the peak for TMS at 0 ppm in the C-NMR.) First, the total amount of terminal methyl (the sum of the main chains and the branches) was calculated. As shown in the chart of FIG. 3, respective integral values were obtained with reference to the integral value ($I_3$) for the methylene hydrogen from 0.7 to 2.0 ppm. Using an integral value ($I_7$) of the peaks from 0.7 to 0.85 ppm, the amount of terminal methyl (—$CH_3$) was calculated from Equation 5 below. As shown in the chart of FIG. 4, using integral values of the peaks from 8 to 12 ppm (a high magnetic field side ($I_8$) and a low magnetic field side ($I_9$)) and from 12 to 16 ppm (a high magnetic field side ($I_{10}$) and a low magnetic field side ($I_{11}$)) and the amount of terminal methyl obtained according to the foregoing, the short-chain branching content was calculated from Equation 6 below.

$$\text{Amount of terminal methyl (mole\%)} = \frac{4I_1I_3I_7}{3I_1I_3+2I_1(3I_4+I_6)+6I_2I_3} \times 100 \quad \text{(Eq. 5)}$$

-continued $$\text{Short-chain branching amount (mole\%)} = \frac{I_8 + I_{10}}{I_8 + I_9 + I_{10} + I_{11}} \times \text{Terminal methyl amount (mole\%)} \quad \text{(Eq. 6)}$$

Figure 4:
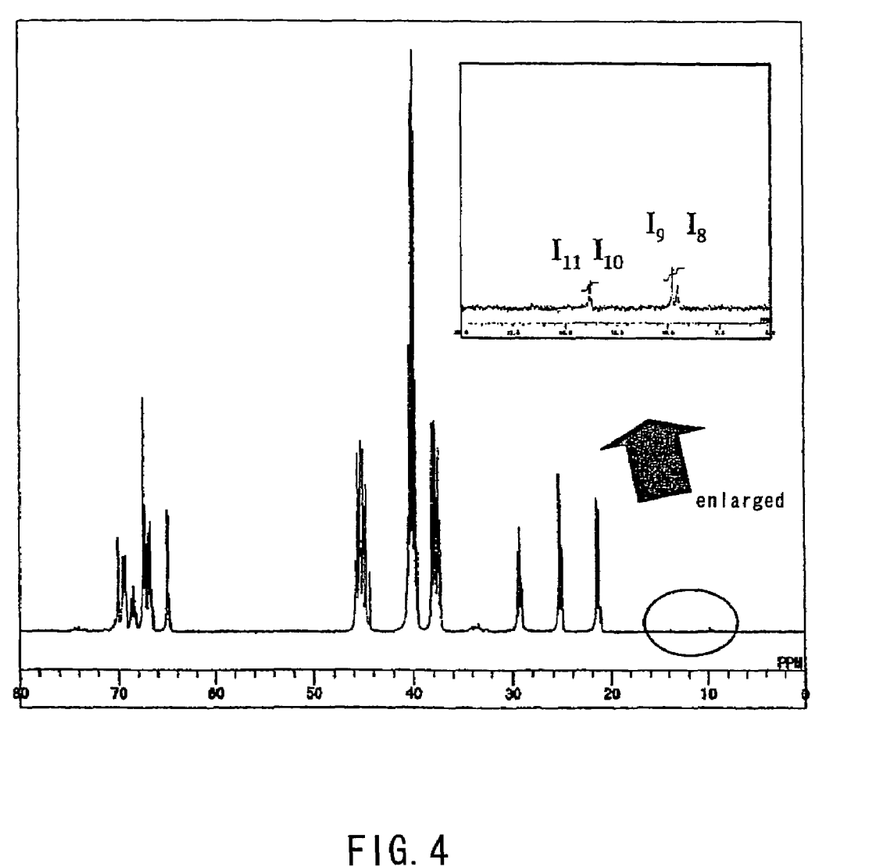
FIG. 4 is one example of the chart obtained through a C-NMR measurement for the typical EVOH.

The integral values ($I_8$) through ($I_{11}$) in FIG. 4 correspond to specific behaviors of the integral value ($I_7$) in FIG. 3. The integral value ($I_8$) originates from the hydrogen of the methyl group in the —$CH_2CH(OH)CH_2CH_3$ group of the short-chain branching, the integral value ($I_9$) originates from the hydrogen of the methyl group in the —$CH_2CH(OH)CH_2CH_3$ group in the main chain, the integral value ($I_{10}$) originates from the hydrogen of the methyl group in the —$CH_2CH_2CH_2CH_3$ group of the short-chain branching, and the integral value ($I_9$) originates from the hydrogen of the methyl group in the —$CH_2CH_2CH_2CH_3$ group of the main chain.

(2) Intrinsic Viscosity 0.20 g of sample dried EVOH pellets was precisely weighed and dissolved into a 40 mL aqueous phenol (water/phenol=15/85 weight %) by heating at 60° C. for 4 hours. A measurement was conducted with an Ostwald viscometer at a temperature of 30° C. ($t_0$=90 seconds) to obtain an intrinsic (limiting) viscosity [η] from Equation 7 below.

$$[\eta] = \frac{(2 \times (\eta sp - \ln \eta rel))^{1/2}}{C} \quad \text{(Eq. 7)}$$

$\eta sp = t/t_0 - 1$ (specific viscosity)
$\eta rel = t/t_0$ (relative viscosity)
C: EVOH concentration (g/L)
$t_0$: time it takes for the blank (aqueous phenol) to pass through the viscometer
t: time it takes for the aqueous phenol solution in which the sample is dissolved to pass through the viscometer (3) Viscosity-Average Molecular Weight Using the ethylene content obtained from Equation 3 and the intrinsic viscosity ([η]) obtained from Equation 7, a viscosity-average degree of polymerization (Pv) was obtained from Equation 8 below.

$$Pv = ([\eta]/0.0013 \times \text{EXP}(-0.13 \times E/100))^{(1/(0.65-0.059 \times (E/100-0.2)))} \quad \text{(Eq. 8)}$$

(4) Quantification of Alkali Metal Salt

Dried EVOH pellets were pulverized by freeze grinding. The pulverized EVOH thus obtained was sieved with a sieve having a nominal size of 1 mm (according to Japanese Industrial Standards (JIS) Z-8801, Test Sieves Standard). 10 g of EVOH powder that passed through the sieve and 50 mL of 0.01N aqueous hydrochloric acid solution were fed into a 100 mL stoppered Erlenmeyer flask with a cooling condenser attached, and stirred at 95° C. for 10 hours, to thermally extract a solution. 2 mL of extract solution thus obtained was diluted with 8 mL of ion exchanged water. The diluted extract solution was quantitatively analyzed using an ion chromatography analyzer IC7000 made by Yokogawa Electric to quantify the amounts of Na and K ions. In the quantification, calibration curves were used that were prepared using an aqueous sodium chloride solution and an aqueous potassium chloride solution. From the amounts of Na and K ions thus obtained, the amount of an alkali metal salt (A) contained in the dry EVOH was obtained in terms of metal element.

Conditions of the ion chromatography measurement
Column: ICS-C25 made by Yokogawa Denki
Eluent: aqueous solution containing 5.0 mL tartaric acid and 1.0 mL 2,6-pyridinedicarboxylic acid
Measurement temperature: 40° C.
Flow rate of eluent: 1 mL/min
Amount of sample injected: 50 μL (5) Quantification of Boron Compound (B)

100 g of sample dry EVOH chip was put into a porcelain crucible and made into ash in an electric furnace. The obtained ash was dissolved into 200 mL of 0.01 N aqueous nitric acid solution and quantified through atomic absorption spectrometry, and the content of the boron compound was obtained in terms of boron.

(6) Quantification of Phosphoric Acid Radical (D)

5 g of sample EVOH was fed into 25 mL of 0.01N aqueous hydrochloric acid solution and stirred at 95° C. for 6 hours. With the aqueous solution after the stirring, the amount of phosphoric acid radical was quantified through ion chromatography. The column used was ICS-A23 made by Yokogawa Denki, and the eluent was an aqueous solution containing 2.5 mM sodium carbonate and 1.0 mM sodium hydrogencarbonate. It should be noted that a calibration curve prepared using an aqueous phosphoric acid solution was used for the quantification.

(7) Single-layer Film Formation Test

The dried EVOH pellets obtained were subjected to a single-layer film formation, using a 20 mm extruder D2020 made by Toyo Seiki Seisaku-Sho, Ltd. (D(mm)=20, L/D=20, compression ratio: 2.0, screw: full-flight) under the following conditions, and a single layer film was obtained.

Extrusion temperature: C1/C2/C3/Die=175/200/220/230° C.
Screw rotational speed: 40 rpm
discharge amount: 1.3 kg/hr.
Take-up roll temperature: 80° C.
Take-up rate: 3.1 m/min.
Film thickness: 20 μm
50 hr-Long-term Run Stability A film was sampled after 50 hours from the start of the single-layer film formation, and gel-like hard spots (those with a size of about 100 μm or larger, which can be confirmed by naked human eyes) were observed to evaluate the thermal stability.

Rating: Criteria

A: No hard spots are confirmed, and the film is good for practical uses

B: A few hard spots are confirmed, but the film will not cause problems in practical uses C: Hard spots are confirmed, and the film is inadequate for practical uses D: A large number of hard spots are confirmed, and the film is completely unusable for practical uses.

Example 1

Polymerization was conducted in a 250 L capacity polymerization tank with a stirrer having a cooling coil inside, under the following conditions.

| | |
|---|---|
| Vinyl acetate | 102.7 kg |
| Methanol | 18.4 kg |
| Methanol solution of 2,2'-azobis-(2,4-dimethylvaleronitrile) (concentration: 1 g/L) | |
| Polymerization initiator Initial charge amount | 102.7 mL |
| Feed amount during polymerization | 0.32 L/h |
| Polymerization temperature | 60° C. |
| Ethylene pressure in polymerization tank | 39.0 kg/cm$^2$ |
| Polymerization time | 3.3 hrs. |
| Monomer conversion ratio | 9.9% |

It should be noted that the monomer conversion ratio (polymerization rate) was calculated in terms of vinyl acetate.

The copolymerization solution was supplied to a column for purging, and after methanol vapor was introduced from a lower portion of the column to remove unreacted vinyl acetate via a top portion of the column, a 45% methanol solution of the copolymer was obtained. The copolymer was an EVAc having an ethylene content of 32 mole % and a vinyl acetate content of 68 mole %. The methanol solution of the copolymer was introduced into a column-type saponification reactor to conduct a saponification reaction under the following conditions.

| | |
|---|---|
| The concentration of the copolymer in the methanol solution | 20 wt % |
| The concentration of NaOH in the methanol solution | 2 mol/L |
| The amount of NaOH add (with respect to the amount of vinyl acetate ester in the copolymer) | 0.4 mole % |
| Saponification temperature | 60° C. |
| Saponification time | 5 hrs. |

A methanol vapor was blown into the column from a bottom portion thereof while adding sodium hydroxide from three directions, and the methyl acetate formed as a by-product is removed via the top of the column, so that a methanol solution of a modified EVOH in which the remaining acetyl groups were minimized was obtained from the bottom of the column. A mixed vapor of methanol/water=7/3 by weight ratio was blown into the methanol solution to change the composition of the solution into a water/methanol mixture system, and thereafter strands were precipitated in a 10% aqueous methanol solution at 5° C., which were then cut into pellets, so that the EVOH was isolated as a pellet-state product. After sufficiently washed with water, the pellets were subjected to a dipping treatment in boric acid, potassium dihydrogen phosphate, potassium hydrogencarbonate, carbonated water with a concentration of 20 mmol/L, then dried at 65° C. to 110° C., and pellets of an EVOH resin composition were obtained. The results of the analysis for the additives showed that in the copolymer, the content of the boric acid (in terms of boron) was 0.1 wt %, the potassium concentration (in terms of potassium element) was 140 ppm, and the phosphoric acid concentration (in terms of phosphoric acid radical) was 40 ppm. The MI measured at 190° C. was 1.7. The amounts of microstructures in the EVOH resin composition thus obtained and the results of the long-run test are shown in Tables 1 and 2.

Comparative Example 1

An EVOH resin composition having an ethylene content of 32 mole % was obtained through the same operation as in Example 1 except that 1.218 g of 2,2'-azobis(2-methylpropionitrile), used as the polymerization initiator, was charged at an initial stage to effect polymerization and that the polymerization rate was made 50%. The amounts of the microstructures in the EVOH resin composition obtained and the results of the long-run test are shown in Tables 1 and 2.

Example 2

An EVOH resin composition having an ethylene content of 32 mole % was obtained through the same operation as in Comparative Example 1 except that the EVAc obtained through the polymerization was reduced under the following conditions. The amounts of the microstructures in the EVOH resin composition obtained and the results of the long-run test are shown in Tables 1 and 2.

Reduction Conditions:

150 g of EVAc and 900 mL of diethylene glycol dimethyl ether were put into a 3 L capacity separable flask equipped with a cooling pipe, a mixing impeller, and a nitrogen introducing pipe and dissolved completely. Into the flask, sodium hydroborate powder was added little by little in a total of 110 g, then stirred and dispersed sufficiently. Thereafter, the mixture was stirred for 2 hours while the internal temperature was kept at 95° C. under a nitrogen gas flow. After the reaction finished, the content was emptied into water, water-washed and dried sufficiently, followed by a saponification reaction.

Example 3

Polymerization was conducted in a 250 L capacity polymerization tank with a stirrer having a cooling coil inside, under the following conditions.

| | |
|---|---|
| Vinyl acetate | 79.2 kg |
| Methanol | 42.5 kg |
| Initial charge amount of polymerization initiator | |
| Methanol solution of dicyclohexylperoxydicarbonate (concentration: 25 g/L) | 12.7 kg |
| Feed amount of polymerization initiator during polymerization | |
| The foregoing methanol solution | 0.22 L/h |
| Polymerization temperature | 30° C. |
| Ethylene pressure in polymerization tank | 24.2 kg/cm$^2$ |
| Polymerization time | 3.0 hrs. |
| Monomer conversion ratio | 10.7% |

The copolymerization solution was supplied to a column for purging, and after methanol vapor was introduced from a lower portion of the column to remove unreacted vinyl acetate via a top portion of the column, a 45% methanol solution of the copolymer was obtained. The copolymer was an EVAc having an ethylene content of 32 mole % and a vinyl acetate content of 68 mole %. The methanol solution of the copolymer was introduced into a column-type saponification reactor to conduct a saponification reaction under the same conditions as in Example 1, and the same process was performed as in Example 1 to obtain an EVOH resin composition.

The amounts of microstructures in the EVOH and the results of the analysis for the additives are shown in Tables 3 and 4. The results of the long-run test with the EVOH are also shown in Tables 3 and 4.

Comparative Example 2

An EVOH was obtained according to the producing method as set forth in Example 3 except that 1.04 L of a methanol solution of dicyclohexylperoxydicarbonate (concentration 3.8 g/L), used as the polymerization initiator, was charged at an initial stage to effect polymerization and thereafter added at a rate of 0.93 L/h successively to make the polymerization rate 50%. The results of the analysis for the additives, the amounts of microstructures, and the results of the long-run test are shown in Tables 3 and 4.

Comparative Example 3

Polymerization was conducted in a 250 L capacity polymerization tank with a stirrer having a cooling coil inside, under the following conditions.

| | |
|---|---|
| Vinyl acetate | 87.6 kg |
| Methanol | 25.5 kg |
| 2,2'-azobis(4-methoxy-2,4-dimethylvaleronitrile) | 77 g |
| Polymerization temperature | 25° C. |
| Ethylene pressure in polymerization tank | 26.0 kg/cm$^2$ |
| Polymerization time | 10 hrs. |
| Monomer conversion ratio | 10% |

With the copolymerization solution, an ethylene-vinyl alcohol based copolymer was obtained according to the producing method as set forth in Example 3. Furthermore, a saponification reaction was effected under the same conditions as in Example 1 except that the amount of NaOH added was 2.5 mole %, and the same process as in Example 1 was conducted to obtain an EVOH resin composition.

The amounts of the microstructures in the EVOH and the results of the long-run test are shown in Tables 3 and 4.

Example 3 achieved the same polymerization rate as that of Comparative Example 3 under a similar temperature condition to, and a shorter polymerization time than, Comparative Example 3, and it became clear that such an EVOH had a less 1,2-glycol amount and achieved a significantly improved thermal stability.

TABLE 1

| | Polymerization temperature (° C.) | Polymerization rate (%) | Reduction | Ethylene content (mole %) | Viscosity average degree of polymerization | Potassium content (ppm) | Phosphoric acid radical (ppm) |
|---|---|---|---|---|---|---|---|
| Ex. 1 | 60 | 9.9 (3.3) | No | 32 | 1100 | 140 | 40 |
| Ex. 2 | 60 | 50 (3.3) | Performed | 32 | 1100 | 140 | 40 |
| Comp. Ex. 1 | 60 | 50 (3.3) | No | 32 | 1100 | 140 | 40 |

In the column of polymerization rate, the values within the parentheses denote polymerization time (hrs.).

TABLE 2

| | Remaining acetyl groups (mole %) | Total amount of terminal carboxylic acid (IV) + lactone ring (V) (mole %) | 1,2-glycol Amount (mole %) | Short-chain branching content (mole %) | Evaluation of long-term run stability |
|---|---|---|---|---|---|
| Ex. 1 | 0.01 | 0.09 | 0.71 | 0.15 | A |
| Ex. 2 | 0.01 | 0.07 | 0.71 | 0.15 | A |
| Comp. Ex. 1 | 0.01 | 0.16 | 0.71 | 0.14 | C |

TABLE 3

| | Polymerization temperature (° C.) | Polymerization rate (%) | Reduction | Ethylene content (mole %) | Viscosity average degree of polymerization | Potassium (ppm) | Boric acid (ppm) | Phosphoric acid radical (ppm) |
|---|---|---|---|---|---|---|---|---|
| Ex. 3 | 30 | 10.7 (3.0) | No | 32 | 800 | 140 | 1000 | 20 |
| Comp. Ex. 2 | 60 | 50 (3.0) | No | 32 | 800 | 140 | 1000 | 20 |
| Comp. Ex. 3 | 25 | 10 (10) | No | 32 | 800 | 140 | 1000 | 20 |

In the column of polymerization rate, the values within the parentheses denote polymerization time (hrs.).

TABLE 4

| | Remaining acetyl groups (mole %) | Total amount of terminal carboxylic acid (IV) + lactone ring (V) (mole %) | 1,2-glycol Amount (mole %) | Short-chain branching content (mole %) | Evaluation of long-term run stability |
|---|---|---|---|---|---|
| Ex. 3 | 0.01 | 0.07 | 0.50 | 0.14 | A |
| Comp. Ex. 2 | 0.01 | 0.16 | 0.71 | 0.15 | D |
| Comp. Ex. 3 | 0.60 | 0.13 | 0.66 | 0.15 | C |

INDUSTRIAL APPLICABILITY

The present invention makes it possible to obtain ethylene-vinyl alcohol based copolymer with its thermal stability fundamentally improved, that does not form fish eyes or hard spots during heat treatment and molding process and is excellent in long-term run stability in melt molding. The present invention has great utility value in the technical field of ethylene-vinyl alcohol based copolymer.

The invention claimed is:

1. An ethylene-vinyl alcohol based copolymer, comprising:

ethylene units (III), vinyl alcohol units (IV), and vinyl ester units (V), wherein the proportion of the ethylene units (III) with respect to the total of the units (III+IV+V) ranges from 20 to 60 mole %, and the proportion of the total (I+II) of carboxylic acids units (I) and lactone ring units (II) in copolymer terminals with respect to the total (III+IV+V) of the units is 0.12 mole % or less, the respective units (I) through (V) represented by formulae:

where
X is a hydrogen atom, a hydroxyl group, or an esterified hydroxyl group,
Y is a hydrogen atom, an alkali metal, or an alkaline earth metal, and
R is a linear or branched alkyl group, and
wherein the ethylene-vinyl alcohol based copolymer conforms to the expression $$G < 1.53 - 0.0239 \times Eu$$

where G is a numerical value representing the content of 1,2-glycol units, expressed as mole %, and Eu is a numerical value representing the proportion of the ethylene units (III) with respect to the total (III+IV+V) of the ethylene units (III), the vinyl alcohol units (IV), and the vinyl ester units (V), expressed as mole %.

2. The ethylene-vinyl alcohol based copolymer according to claim 1, wherein the content of ethylene units ranges from 22 to 60 mole %.

3. The ethylene-vinyl alcohol based copolymer according to claim 1, wherein the content of ethylene units ranges from 24 to 55 mole %.

4. The ethylene-vinyl alcohol based copolymer according to claim 1, wherein the intrinsic viscosity of the ethylene-vinyl alcohol based copolymer ranges from 0.05 to 1.5 dL/g.

5. An ethylene-vinyl alcohol based copolymer, comprising:

ethylene units (III), vinyl alcohol units (IV), and vinyl ester units (V), wherein the proportion of the ethylene units (III) with respect to the total of the units (III+IV+V) ranges from 20 to 60 mole %, the proportion of the total (I+II) of carboxylic acids units (I) and lactone ring units (II) in copolymer terminals with respect to the total (III+IV+V) of the units is 0.12 mole % or less, and wherein the proportion of the vinyl ester units (V) with respect to the total (IV+V) of the vinyl alcohol units (IV) and the vinyl ester units (V) is 0.20 mole % or less, the respective units (I) through (V) represented by formulae:

where
X is a hydrogen atom, a hydroxyl group, or an esterified hydroxyl group,
Y is a hydrogen atom, an alkali metal, or an alkaline earth metal, and
R is a linear or branched alkyl group,
wherein the ethylene-vinyl alcohol based copolymer conforms to the expression

$$G < 1.53 - 0.0239 \times Eu$$

where G is a numerical value representing the content of 1,2-glycol units, expressed as mole %, and Eu is a numerical value representing the proportion of the ethylene units (III) with respect to the total (III+IV+V) of the ethylene units (III), the vinyl alcohol units (IV), and the vinyl ester units (V), expressed as mole %.

6. A method for producing an ethylene-vinyl alcohol based copolymer which comprises ethylene units (III), vinyl alcohol units (IV), and vinyl ester units (V), wherein the proportion of the ethylene units (III) with respect to the total of the units (III+IV+V) ranges from 20 to 60 mole %, and the proportion of the total (I+II) of carboxylic acids units (I) and lactone ring units (II) in copolymer terminals with respect to the total (III+IV+V) of the units is 0.12 mole % or less, and wherein the expression $$G < 1.53 - 0.0239 \times Eu$$

is satisfied, where G is a numerical value representing the content of 1,2-glycol units, expressed in mole %, and Eu is a numerical value representing the proportion of the ethylene units (III) with respect to the total (III+IV+V) of the ethylene units (III), the vinyl alcohol units (IV), and the vinyl ester (V), expressed as mole %, the respective units (I) through (V) represented by formulae:

where
X is a hydrogen atom, a hydroxyl group, or an esterified hydroxyl group,
Y is a hydrogen atom, an alkali metal, or an alkaline earth metal, and
R is a linear or branched alkyl group,
the method comprising:
saponifying an ethylene-vinyl ester based copolymer wherein the proportion of ethylene units (III) with respect to the total of the units (III+V) of the ethylene units (III) and vinyl ester units (V) ranges from 20 to 60 mole % to obtain an ethylene-vinyl alcohol based copolymer; and
reducing at least one substance selected from the ethylene-vinyl ester based copolymer and the ethylene-vinyl alcohol based copolymer component by contacting the at least one substance with a reducing agent.

7. A method for producing an ethylene-vinyl alcohol based copolymer which comprises ethylene units (III), vinyl alcohol units (IV) and vinyl ester units (V), wherein the proportion of ethylene units (III) with respect to the total of the units (III+IV+V) ranges from 20 to 60 mole %, and the proportion of the total (I+II) of carboxylic acids units (I) and lactone ring units (II) in copolymer terminals with respect to the total (III+IV+V) of the units is 0.12 mole % or less, wherein the proportion of the vinyl ester units (V) with respect to the total (IV+V) of the vinyl alcohol units (IV) and the vinyl ester units (V) is 0.20 mole % or less, and wherein the expression $$G < 1.53 - 0.0239 \times Eu$$

is satisfied, where G is a numerical value representing the content of 1,2-glycol units, expressed in mole %, and Eu is a numerical value representing the proportion of the ethylene units (III) with respect to the total (III+IV+V) of the ethylene units (III) and the vinyl alcohol units (IV) and the vinyl ester units (V), expressed as mole %, the respective units (I) through (V) represented by the following formulae:

where
X is a hydrogen atom, a hydroxyl group, or an esterified hydroxyl group,
Y is a hydrogen atom, an alkali metal, or an alkaline earth metal, and
R is a linear or branched alkyl group,
the method comprising:
saponifying an ethylene-vinyl ester based copolymer wherein the proportion of ethylene units (III) with respect to the total of the units (III+V) of the ethylene units (III) and vinyl ester units (V) ranges from 20 to 60 mole % to obtain an ethylene-vinyl alcohol based copolymer; and
reducing at least one substance selected from the ethylene-vinyl ester based copolymer and the ethylene-vinyl alcohol based copolymer component by contacting the at least one substance with a reducing agent.

8. A method for producing an ethylene-vinyl alcohol based copolymer which comprises ethylene units (III), vinyl alcohol units (IV) and vinyl ester units (V), wherein the proportion of ethylene units (III) with respect to the total of the units (III+IV+V) ranges from 20 to 60 mole %, and the proportion of the total (I+II) of carboxylic acids units (I) and lactone ring units (II) in copolymer terminals with respect to the total (III+IV+V) of the units is 0.12 mole % or less, and wherein the expression $$G < 1.53 - 0.0239 \times Eu$$

is satisfied, where G is a numerical value representing the content of 1,2-glycol units, expressed in mole %, and Eu is a numerical value representing the proportion of the ethylene units (III) with respect to the total (III+IV+V) of the ethylene units (III), the vinyl alcohol units (IV) and the vinyl ester units (V), expressed as mole %, the respective units (I) through (V) represented by formulae:

—CH$_2$—CH$_2$— (III)

—CH$_2$—CH$_2$— (IV)
     |
    OH

-continued where
- X is a hydrogen atom, a hydroxyl group, or an esterified hydroxyl group,
- Y is a hydrogen atom, an alkali metal, or an alkaline earth metal, and
- R is a linear or branched alkyl group, the method comprising:
copolymerizing ethylene and a vinyl ester so that the proportion of ethylene units (III) with respect to the total of the units (III+V) of the ethylene units (III) and the vinyl ester units (V) becomes 20 to 60 mole % to obtain an ethylene-vinyl ester based copolymer; and saponifying the ethylene-vinyl ester based copolymer to obtain an ethylene-vinyl alcohol based copolymer, wherein said copolymerizing occurs at a polymerization temperature of from −20° C. to 90° C. and at a polymerization rate of from 3% to 48% with respect to the vinyl ester.

9. The method for producing an ethylene-vinyl alcohol based copolymer according to claim 8, wherein a polymerization time for said copolymerizing is set to within the range from 1 hour to 7 hours.

* * * * *